United States Patent [19]

Bitsch

[11] Patent Number: 4,506,112

[45] Date of Patent: Mar. 19, 1985

[54] TELEPHONE SET INCLUDING A CIRCUIT FOR SEIZING THE LINE WITHOUT LIFTING THE HANDSET OFF THE GRAVITY SWITCH

[75] Inventor: Philippe Bitsch, Strasbourg, France

[73] Assignee: La Telephonie Industrielle et Commerciale Telic Alcatel, Strasbourg, France

[21] Appl. No.: 483,307

[22] Filed: Apr. 8, 1983

[30] Foreign Application Priority Data

Apr. 9, 1982 [FR] France .................. 82 06243

[51] Int. Cl.³ .......................................... H04M 11/00
[52] U.S. Cl. .................... 179/81 R; 179/2 C; 179/100 L
[58] Field of Search ............... 179/2 A, 2 C, 2 DP, 179/5.5, 81 R, 81 B, 99 H, 100 L

[56] References Cited

U.S. PATENT DOCUMENTS

| | | | |
|---|---|---|---|
| 3,766,321 | 10/1973 | Sato .................. | 179/2 A X |
| 4,220,820 | 9/1980 | Mallien . | |
| 4,277,651 | 7/1981 | Fisher et al. . | |
| 4,378,470 | 3/1983 | Murto et al. .......... | 179/2 C |
| 4,415,774 | 11/1983 | Driver .............. | 179/2 DP |

FOREIGN PATENT DOCUMENTS 2487611  1/1982  France .................. 179/2 C

Primary Examiner—Keith E. George
Attorney, Agent, or Firm—Sughrue, Mion, Zinn, Macpeak and Seas

[57] ABSTRACT

Telephone sets associated with terminal units such as modems or telecopiers generally need to be used without the handset being lifted off the gravity switch. Such telephone sets also tend to include electronic circuitry which is powered by DC derived from the telephone line via a diode bridge (11) to protect against reversals of line polarity. The line is initially looped by a user-operated switch (T) having contacts (t1) connected in parallel with the gravity switch looping contacts (cc1), and thus on the line or AC side of the bridge (11). Once adequate power is supplied to a controlling microprocessor (5), it causes a relay (RE) to close line-holding contacts (re1) in parallel with the looping contacts already mentioned (t1, cc1). The loop is released by means of a release transistor (15) connected in a common return wire on the DC side of the bridge (11). The line-holding contacts are not released until current has ceased to flow in the line, thereby enabling a miniature relay to be used without fear of line current surges welding its contacts together.

6 Claims, 3 Drawing Figures

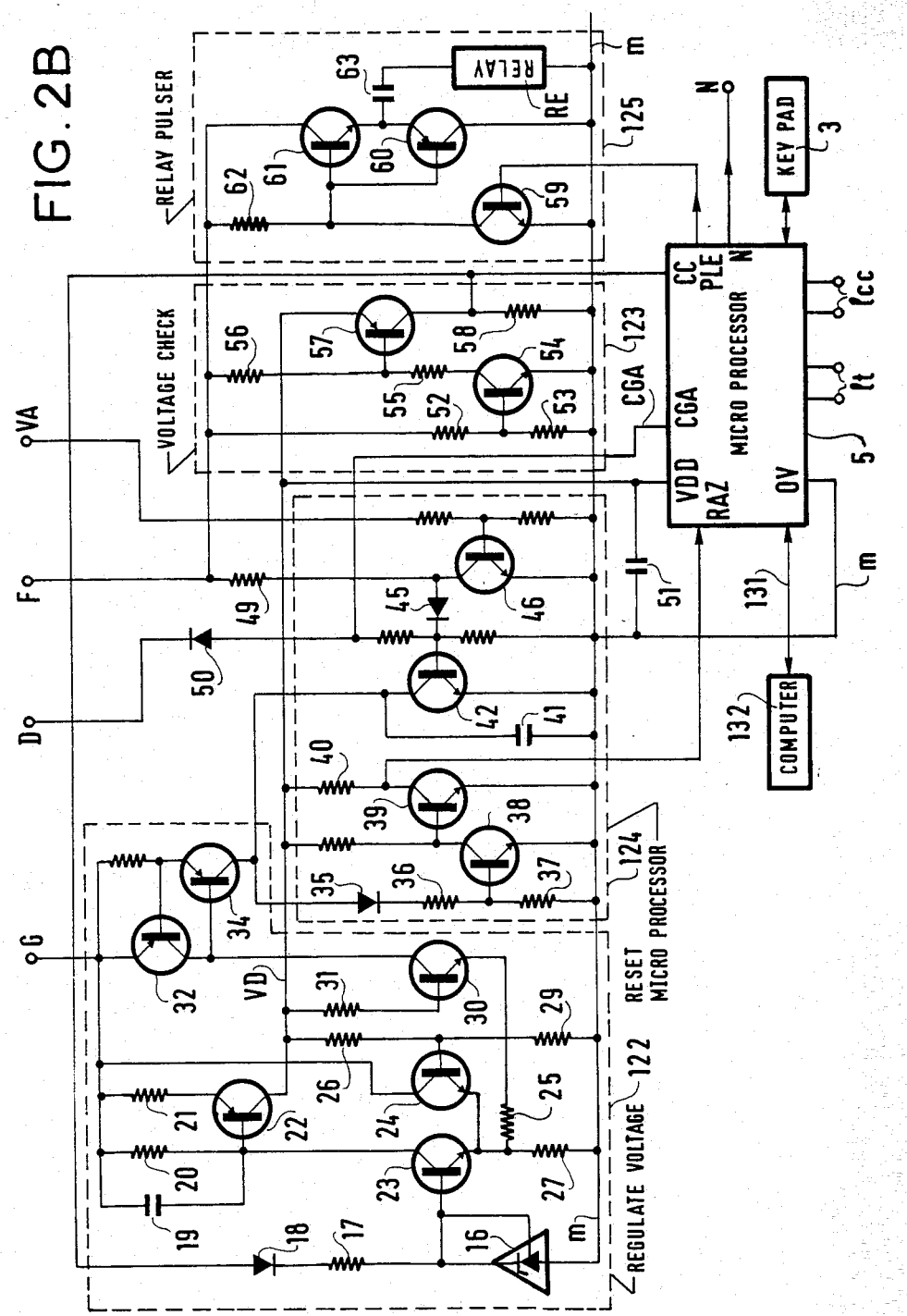

TELEPHONE SET INCLUDING A CIRCUIT FOR SEIZING THE LINE WITHOUT LIFTING THE HANDSET OFF THE GRAVITY SWITCH

BACKGROUND OF THE INVENTION

The present invention relates to a telephone set including a circuit for seizing the line to which it is connected without lifting the handset off the gravity switch.

Normally a telephone user seizes the line to which the telephone is connected simply by lifting the handset off the telephone. This simple act operates a "gravity" switch on which the handset is supported, and contacts of the gravity switch loop the telephone line. The exchange then feeds power to the telephone via the pair of wires which also serve to convey speech and signalling such as dial pulsing. Once the line is looped so that current can flow, the telephone becomes unavailable for receiving calls from other telephones (it becomes "engaged"), and it is connected to exchange equipment for receiving instructions from the user.

Telephone sets are increasingly being equipped with electronic circuits, and in particular with microprocessors, which need to be powered from the telephone line before they can be used. However, such telephone sets include sets associated with various terminals such as telecopiers, or modems, or directory interrogation devices which may well be used without the user ever wanting to speak into the telephone. The simplest way of "turning on" a telephone set so that it can be used with such a terminal is simply to lift the handset off its gravity switch and then rest it on some other support. This solution is not entirely satisfactory: firstly there is the problem of sounds being picked up by the microphone which may be embarassing to the user or which may interfere with operation of the terminal, or both; and secondly there is a considerable risk that the user will forget to replace the handset, in which case an excessive telephone bill may result, and the telephone set and its associated terminal are prevented from receiving incoming calls, since the microprocessor is incapable of replacing the handset itself.

The present invention therefore provides a telephone set which is capable of seizing its telephone line without the handset being lifted off the gravity switch.

SUMMARY OF THE INVENTION

The present invention provides a telephone set for connection to a telephone exchange over a telephone line comprising a pair of line wires, the telephone set including: a handset; a gravity switch operated by lifting said handset to seize a telephone line connected to the telephone set by looping said line; a microprocessor and associated electronic circuits requiring DC power for their operation; a diode bridge connected to draw power from a looped telephone line connected to the telephone set and to supply said microprocessor and associated electronic circuits with DC at a predetermined polarity regardless of the polarity of the wires of the telephone line; said bridge being connected to said microprocessor and associated electronic circuits via a power supply network including a common return wire; the improvement wherein the telephone set further includes a circuit for seizing the telephone line by looping the line without lifting the handset off the gravity switch, said circuit including a user-operable call switch having line seizing contacts connected on the line side of the diode bridge in parallel with line seizing contacts of the gravity switch, a relay having line holding contacts connected in parallel with said line seizing contacts of the gravity switch and of the user-operable call switch, and a line release transistor connected in series in said common return wire and capable of connecting and of disconnecting said common return wire from said diode bridge, said microprocessor being connected to control said relay and said release transistor, and being programmed to respond to a user operating said call switch and thereby initially seizing said line by operating said relay to hold the line loop, and to subsequently release the line by turning off said release transistor before releasing said relay, said relay being released after current has ceased to flow in the telphone line, thereby protecting the relay's line holding contacts from being damaged by current surges in the line during release thereof.

BRIEF DESCRIPTION OF THE DRAWINGS

An embodiment of the invention is described by way of example with reference to the accompanying drawings, in which:

FIGS. 2A and 2B are circuit diagrams of the on-hook line seizing circuit and of parts of the telephone set associated with its operation.

DETAILED DESCRIPTION OF THE PREFERRED EMBODIMENTS

Figure 1:
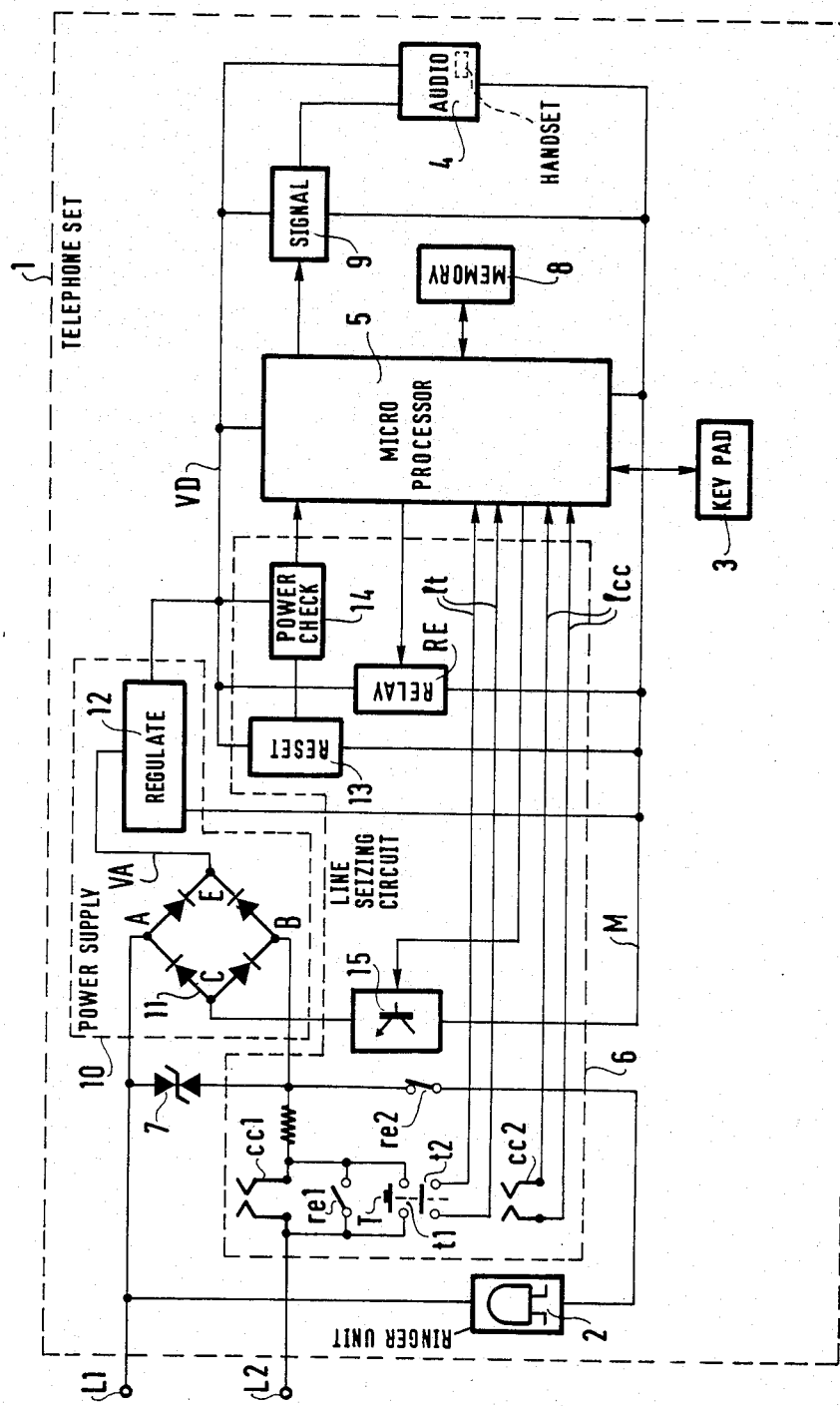
FIG. 1 is a block diagram of a telephone set in accordance with the invention and including a microprocessor and equipped with an on-hook line seizing circuit.

The telephone set 1 shown in FIG. 1 is connected to an exchange (not shown) via two line wires L1 and L2. In conventional manner, the line wires are suitable for feeding direct current (DC) to the telephone set 1 from the exchange and for providing a communication path between the telephone 1 and the exchange, and hence between the telephone 1 and other telephones which can be reached via the exchange.

The telephone set 1 comprises a ringer unit 2 for indicating when other telephones are calling the set 1, a key pad unit 3 for enabling a user to set up a call to another set and to signal other requirements to the exchange, and an audio unit 4 for performing two-way conversion between signals in a form suitable for being conveyed on the line wires L1 and L1 and signals useable by the telephone user, whether man or machine.

A logic unit based on a microprocessor 5 together with a plurality of auxiliary circuits co-ordinates operation of the set 1, at least when it is used as a telephone.

A line seizing circuit 6, which constitutes one of the auxiliary circuits mentioned above serves to retain the line for a user of the telephone set for the purpose of making a call to another set via the line wires L1 and L2.

The unit 4 is usually referred to as the audio circuit, and includes a conventional handset having a microphone and an earphone. It may further include a loud speaker (not shown) enabling several people to listen to a call simultaneously, and/or a modem (not shown) for transmitting data which may be displayed on a display unit. The unit 4 sends and receives suitable signals over the line wires L1 and L2 to which it is connected when a call is established.

The unit 2 is usually referred to as a ringer, and is connected to the line wires L1 and L2 upstream from the other components of the telephone set, and in particular upstream from the seizing circuit 6 which serves to isolate the components of the telephone set other than the ringer 2 from the line whenever the telephone set is not being used for an established call or for setting up a call. A relay RE is operated whenever a call is in progress or is being set up and has a normally closed contact re2 which serves to isolate the ringer unit 2 whenever the relay RE is in its working position and to reconnect the ringer unit 2 whenever the relay RE returns to its rest position. A conventional protective component 7 is provided across the line wires L1 and L2, since the ringer unit 2 may be a bell set including diodes to prevent tinkling, or an electronic ringer which actuates the telephone set's loud speaker. The unit 3 may comprise a dial, but is preferably a push button key pad. It is connected to the microprocessor 5 via an interface circuit (not shown) which feeds power to the unit 3 and which monitors it in such a manner as to enable a user to enter data concerning telephones to be called or operation of the telephone set 1 itself.

Other auxiliary circuits assist the microprocessor 5, both in its own operation, eg. a memory circuit 8, and in the application which it controls, eg. a signalling unit 9 which may generate dial pulses or multifrequency tones for setting up calls through the exchange to which the telephone set 1 is connected.

A power supply unit 10 supplies power to the power consuming units of the telephone set 1 via power rails symbolised by wires VA and M which are connected to the positive and negative terminals respectively of a diode bridge 11 which determines the direction in which DC power is applied to the telephone set regardless of the polarities of the wires L1 and L2 from which it draws the power. The diode bridge 11 feeds a regulator circuit 12 which matches the DC supplied by the bridge 11 to the requirements of the units powered thereby, and which regulates the supply of power as a function both of load and of a system of priorities. The regulated DC is applied to a regulated positive power rail VD.

The user of the telephone set 1 sets up a call by means of the seizing circuit 6 which may be actuated either by taking the handset off hook or by pressing a user-operable call switch in the form of a push button T while leaving the handset on hook.

Taking the handset off hook operates a gravity switch having two sets of springs cc1 and cc2, with the set cc1 serving to loop the line. A circuit 13 serves to activate (reset) the microprocesser 5, but effective activation is delayed by a power supply monitoring circuit 14 until the power supplied by the unit 10 meets the requirements necessary for proper operation of the microprocessor 5.

The spring set cc2 is connected via wires 1cc to the microprocessor 5 to signal the fact that the telephone handset is off hook.

If the button T is pressed while the handset is on hook, the line is likewise looped to supply power to the telephone set because the button T has a contact t1 connected in parallel with the spring set cc1 of the gravity switch.

Either way, once the telephone set is powered up, the microprocessor 5 is reset by the circuit 13 as soon as the monitoring circuit 14 is satisfied that the power supply is adequate.

The microprocessor then controls the line seizing relay RE in the unit 6 to cause its normally open contact set re1 to close in parallel with the gravity switch spring set cc1 and the contact t1 of the button T. The relay RE is preferably a miniature bistable relay so as to be compatible with the electronic circuits of the telephone set. The closed contact set re1 loops the line L1, L2 and the button T may be released. An extra set of contacts (not shown) of the relay RE is used to inform the microprocessor 5 of the state of the relay thereby enabling the microprocessor to inform the user that the button T can be released. This information may be conveyed in various ways, eg., via a loud speaker or via a display unit if the telephone set is equipped with either.

Once the line is looped even though the handset is still on hook, it is necessary to provide means for releasing the relay to open the contacts re1 and hence open the loop.

Opening the loop generally induces a vigourous current surge because of the line inductance, and there is a relatively high risk of welding together the contacts re1 if the relay RE is a miniature relay chosen for its compatibility with the electronic components of the telephone set.

To avoid this happening, the line seizing circuit 6 is provided with a seizure release switch unit 15 (preferably a transistor) which is under the control of the microprocessor 5 and capable of being turned off to open circuit the power supply loop inside the telephone set 1 at the end of a call.

The release transistor 15 is connected between one end of the return power supply rail M and the negative terminal C of the diode bridge 11 in such a manner as to be able to isolate the negative terminals of the circuits connected to the rail M from the negative terminal C of the diode bridge 11.

Since the release transistor 15 turns off the power supply to the circuits in the telephone set and in particular to the logic circuit which includes the microprocessor 5, an auxiliary power supply is provided which operates at least temporarily to ensure that the bistable relay RE is released after the loop has itself been released so that the contacts re1 return to their normally open configuration.

The auxiliary power supply is preferably in the form of smoothing capacitors (not shown) which are connected across the terminals of the circuits involved and in particular across the microprocessor.

Figure 2A:
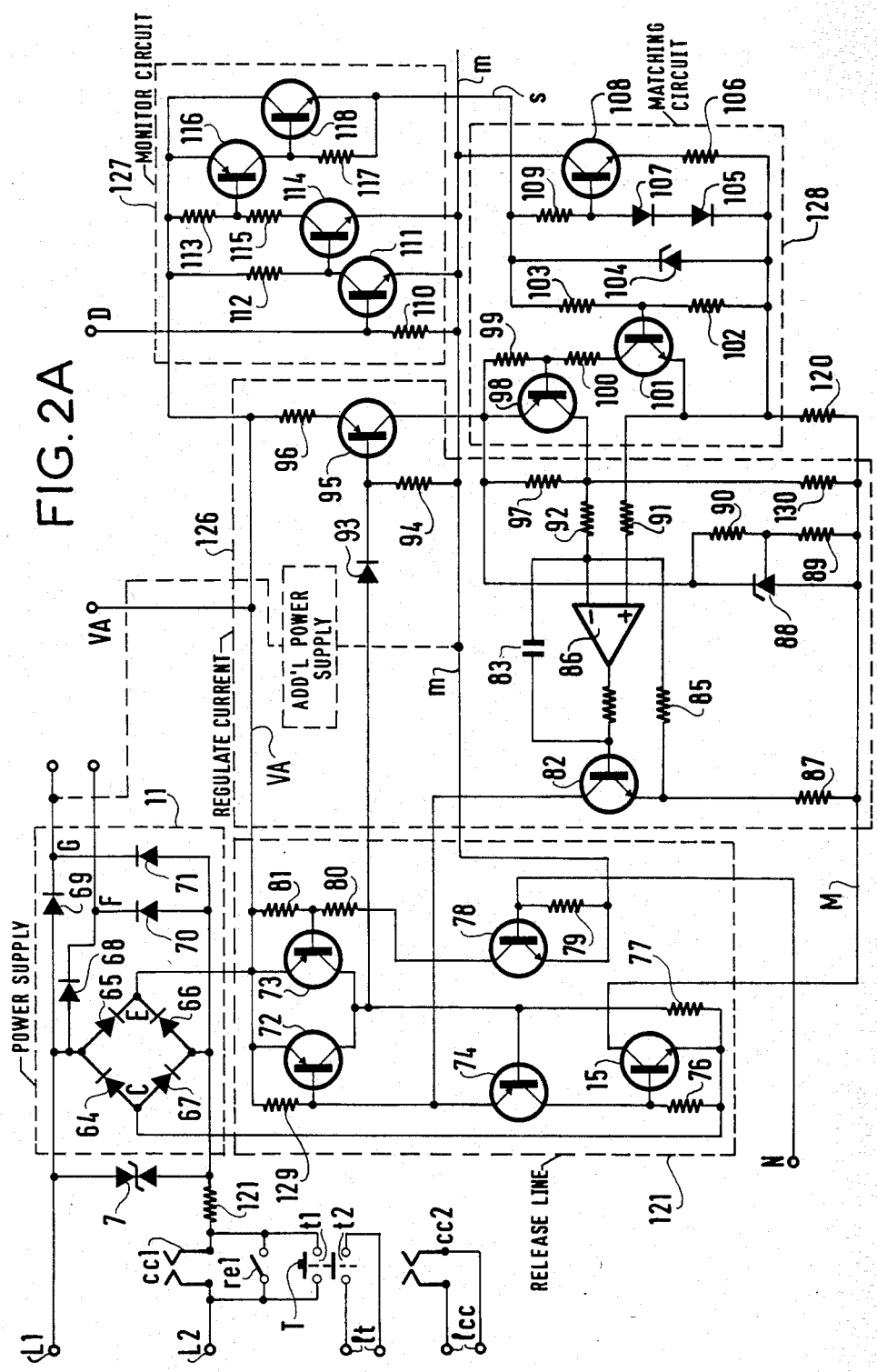

FIGS. 2A and 2B are circuit diagrams showing a particular embodiment of the various components of a line seizing circuit and the associated circuits in the telephone set.

The lines wires L1 and L2, the gravity switch contact sets cc1 and cc2, the contact set re1 of the relay RE, the contact t1 and microprocessor starting contact t2 of the button T and the diode bridge 11 are all shown in FIG. 2A.

In the embodiment shown, the diode bridge 11 has AC terminals A and B connected to the line wires L1 and L2 has three DC power supply outlets E, F and G together with a common return C. This is done by connecting four pairs of series connected diodes 64 to 71 across the AC terminals A and B.

The power supply terminals E, F and G are all at the same positive voltage, but they power different components of the telephone set as a function of their various roles, and they enable said components to be selectively powered independently of each other should that be necessary.

The microprocessor 5 is powered from the terminal G via a regulator circuit 122 in the power supply unit 10.

The regulator circuit 122 is connected to the positive terminal G of the diode bridge, and to its common return terminal C via wires m and then M, and then via the release transistor 15.

The regulator circuit 122 is brought into action by a line voltage check circuit 123 and its regulator voltage is determined internally by a regulator 16 having its outlet fed back to its control input. The regulated power supply rail is the rail VD.

A reset circuit 124 starts the microprocessor 5 once the power supply voltage is adequate, as measured across the terminals of a capacitor 51.

Once sufficient voltage is applied to the line voltage monitoring circuit 123 which is connected between the positive terminal F of the diode bridge and the wire m, a line current flag CC is applied to an interrupt input of the microprocessor 5 by means of suitably connected NPN and PNP transistors 54 and 57 respectively, together with their associated bias resistors 52, 53, 55, 56 and 58.

The line current flag CC is simultaneously applied to the regulator circuit 122 to control the base of an NPN transistor 23 via a diode 18 and a resistor 17. The base of the transistor 23 is also connected to the regulator 16. The transistor 23 controls a main power regulating PNP transistor 22 having its collector connected to feed current to the regulated positive power rail VD, its emitter connected to the unregulated positive power supply terminal G via a low value resistor 21, and its base also connected to the unregulated terminal G via a bias resistor 20 and a decoupling capacitor 19. The voltage on the rail VD is detected by a potential divider made up of two resistors 26 and 29 which control the base of an NPN transistor 24 which shares an emitter resistor 27 with the transistor 23, and which has its collector connected to the unregulated rail G. The transistors 23 and 24 constitute a long-tail pair controlling the flow of current through the power regulating transistor 22 in such a manner that the regulated rail VD remains at a constant voltage from the negative rail m.

A power supply smoothing capacitor 51 with a value of about 220 microfarads is connected between the regulated rail VD and the negative wire m to maintain power to the microprocessor 5 during short interruptions, eg. during loop-disconnect dialling.

Once there is voltage on the regulated rail VD, a transistor 30 having its base connected to the rail VD via a resistor 31 and its emitter connected to the emitters of the long-tail pair 23 and 24 via a resistor 25 is turned on. The collector of the transistor 30 is connected to turn on a Darlington-connected pair of transistors 32 and 34 which acts as a constant current source between the unregulated rail G and a timing capacitor 41 in the reset circuit 124. The arrangement serves to charge the capacitor 41 in substantially the same time lapse regardless of the length of line to which the telephone may be connected.

The reset circuit circuit 124 is necessary because the microprocessor 5 is powered only while the telephone set in which it is installed is being used. When it is turned on anew, it must be forced to start by executing instructions from a specific point in its program.

The reset input RAZ of the microprocessor 5 is initially connected to low voltage via an NPN transistor 39 which has its emitter connected to the low voltage rail m and which has both its base and its collector connected to the regulated rail VD via respective resistors. The base of the transistor 39 is also connected to the collector of an NPN transistor 38 which is connected to be switched on by the Darlington pair 32, 34 supplying sufficient current to a pair of resistors 36, 37 connected in series with a diode 35. However, said series connection of resistors 37, 36 and the diode 35 is connected in parallel with the timing capacitor 41, and initially when the Darlington pair is turned on, nearly all the current therefrom flows into the timing capacitor 41 and insufficient flows through the resistors to turn on the transistor 38 and hence to turn off the transistor 39. After a suitable lapse of time, the voltage on the capacitor 41 rises to a point where the reset condition is removed from the microprocessor 5, which is then free to execute its program.

An NPN transistor 42 is connected connected across the terminals of the timing capacitor 41 to provide means for discharging it. The base of the transistor 42 is connected to the positive terminal F on the diode bridge via a diode 45 in such a manner as to ensure that the capacitor 41 is discharged each time the telephone set is re-connected to the exchange.

An NPN transistor 46 can be used to short circuit the base of the transistor 42 via the diode 45 from the moment a voltage appears at the diode bridge terminal F. A wire CGA connects the microprocessor 5 to the base of the transistor 42 downstream from the diode 45 and enables the microprocessor 5 to inhibit further resetting.

After the call button T for seizing the line has been pressed, the relay RE is operated by a relay control circuit 125 under the control of the microprocessor 5, ie. after it has itself been suitably powered up, and has started running its program. A signal PLE is provided for this purpose and is applied to the base of an NPN transistor 59 which is connected between the terminal F and the low voltage wire m via a resistor 62 to bias a pair of complementary transistors 61 and 60. The emitters of the complementary transistors 61 and 60 are connected together and to one terminal of the winding of the relay RE via a capacitor 63. The other terminal of the relay winding is connected to the low voltage rail m as is the collector of the PNP transistor 60, while the collector of the NPN transistor 61 is connected to the unregulated rail F.

When the transistor 59 is turned on under the control of the microprocessor 5, it turns off the transistor 60 and it turns on the transistor 61, thereby discharging the capacitor through the winding of the relay RE. Conversely, turning the transistor 59 off causes the capacitor 63 to be charged through the transistor 61 and the winding of the relay RE. Thus the capacitor 63 ensures that the winding is fed with pulses.

The various circuits shown in FIG. 2A shown to be powered by the diode bridge comprise a line current regulator 126, a line current monitor 127, an off-hook impedance matcher 128, and a switch circuit 121.

In the embodiment described, the release transistor 15 is also used to regulate line current and for transmitting dialing signals.

The transistor 15 is an NPN transistor having its emitter connected to the common negative terminal C of the diode bridge 11 and having its collector connected to the wire M which serves as the lowest voltage line in the line current regulator circuit 126. The wire M is then connected via a low value resistor 120, a slightly higher value resistor 106 and the emitter-collector junction of an NPN transistor 108 to the low voltage line m. The resistors 120 and 106 may be three and twelve ohms respectively. The base of the release transistor 15 is connected to the common negative terminal C via a resistor 76 and is biased via the emitter-collector junction of a PNP transistor 74.

The base of an NPN transistor 78 receives instructions to turn off the release transistor 15 from an output N of the microprocessor 5. The emitter of the transistor 78 is connected to the low voltage line m and its collector is connected to the unregulated terminal E via a potential divider constituted by resistors 80 and 81 connected in series. The intermediate point of said potential divider is connected to bias the base of a PNP transistor 73 which has its emitter-collector junction connected in parallel with that of a PNP transistor 72. The emitters of these transistors are connected to the unregulated terminal E, while their collectors are connected to the common negative terminal C via a high value resistor 77 which serves to bias a PNP transistor 74 having its emitter-collector junction interconnecting the bases of the transistors 72 and 15.

When a voltage is present at E, and so long as the microprocessor is not applying a positive signal N to the base of the transistor 78, the transistor 15 is turned on by the transistor 74 being turned on. If loop-disconnect dialling is used, or during a timed disconnect pulse, or at the end of a call the microprocessor turns on the transistor 78 thereby turning on the transistor 73 which shorts the emitter-collector junction of the transistor 72 and hence turns off the transistors 74 and 15. For short duration interruptions of the power supply from the line, eg. during dialing, power to the microprocessor 5 is maintained by the capacitor 51, or else by a auxiliary power supply, as is likely to be available if the telephone set is provided with a display screen.

At the end of a call, and after the loop has been opened by the transistor 15, the microprocessor 5 applies a control signal to the line PLE to cause the relay RE to change state, but not until it is safe for its contact re1 to open without risk because the line is no longer passing current.

In this embodiment, the release transistor 15 is also used to regulate the line current. For this purpose, the emitter of the transistor 74 is connected to the collector of an NPN transistor 82 at the output of the line current regulator circuit 126. The emitter of the transistor 82 is connected to the wire M via a resistor 87 of fairly low value, eg. 180 ohms.

The regulator circuit 126 is conventionally designed around an operational amplifer 86 having negative feedback via a resistor 85 and stabilised by a capacitor 83. The positive input of the amplifier 86 is connected to the wire M via a resistor 91 and the resistor 120, and its negative input is controlled by regulator diode 88 whose voltage is controlled by a potential divider comprising resistors 89 and 90 connected across the terminals of the diode 88 and two resistors 97 and 130 connected in parallel therewith. The mid point of the divider 97, 130 is connected via a resistor 92 to the negative input of the amplifier 86. The resistor 97 has the emitter-collector junction of a PNP transistor 98 connected in parallel. The base of the transistor 98 is connected to the mid point of a potential divider comprising resistors 99 and 100 which is connected in series with the emitter-collector junction of an NPN transistor 101 which is connected to the connection between the resistors 91 and 120. The high voltage end of the parallel potential dividers 97, 130 and 90, 89 is connected to the collector of a PNP transistor 95 whose emitter is cnnected via a resistor 96 to the unregulated positive terminal E.

The base of the transistor 95 is controlled in parallel with the base of the transistor 74 in the circuit 121 via a diode 93, and the transistor 95 serves to supply power to the circuit 126.

The circuit 127 uses a Darlington-connected pair of transistors 116 and 118 in conventional manner as an amplifier to supply power to the circuit 128 from the moment the microprocessor 5 delivers the off-hook signal CGA via the wire CGA, the diode 50 and the wire D. The circuit 127 comprises NPN transistors 111, 114 and 118 and a PNP transistor 116 connected in conventional manner between a wire VA connected to the terminal E of the diode bridge 11 and the wire m in the case of the transistors 111 and 114 and a wire s in the case of the transistors 116 and 118 with suitable bias resistors 110, 112, 113, 115 and 117.

The current supplied to the circuit 128 over the wire s from the transistor 118 is applied to the anode of a zener diode 104 whose cathode is connected to the wire M via the very low value resistor 120. A potential divider comprising resistors 102, 103 is connected across the terminals of the zener diode 104 so that its mid point controls the base of the NPN transistor 101 whose emitter-collector junction connects the case of the transistor 98 to the wire M via the resistors 100 and 120.

The zener diode sets the voltage of the base of an NPN transistor 108 which connects the low voltage wire m to the wire M via the low value resistors 120 and 106. The base of the transistor 108 is thus connected to the anode of the zener diode 104 via a resistor 109 and to the wire M via the resistor 120 and two series connected diodes 105 and 107.

When the transistor 118 is on, it turns on the transistor 108 thereby connecting the circuits connected to the wire m substantially to the common terminal C by virtue of the low values of the resistors 106 and 120. The potential divider 102, 103 serves to keep a constant base current flowing through the transistor 101 of the line current regulator 126 using a floating arrangement.

It will be observed that the line seizing circuit in accordance with the invention enables the line to be seized from any computer controlled device 132 which may be connected to the microprocessor 5, eg. via a two-way link 131, provided that an extra power supply is fitted to keep the microprocessor in operation even when the telephone set 1 is on-hook.

In one embodiment the additional power supply is connected between the terminals G and m and it is supplied with power from the computer device 132 or from a source under its control.

Once the button T has been pressed, or once the relay RE has settled into its stable working position in which the contacts re1 are closed, it is possible to control line seizure by closing the loop whenever required by the device 132, by instructing the microprocessor 5 to switch the transistor 15 from off to on.

I claim:

1. A telephone set for connection to a telephone exchange over a telephone line comprising a pair of line wires, the telephone set including: a handset; a gravity switch operated by lifting said handset to seize a telephone line connected to the telephone set by looping said line; a microprocessor and associated electronic circuits requiring DC power for their operation; a diode bridge connected to draw power from a looped telephone line connected to the telephone set and to supply said microprocessor and associated electronic circuits with DC power at a predetermined polarity regardless of the polarity of the wires of the telephone line; said bridge being connected to said microprocessor and associated electronic circuits via a power supply network including a common return line; wherein the telephone set further includes a circuit for seizing the telephone line by looping the line without lifting the handset off the gravity switch, said seizing circuit including a user-operable call switch having line seizing contacts connected on the line side of the diode bridge in parallel with line seizing contacts of the gravity switch, a relay having line holding contacts connected in parallel with said line seizing contacts of the gravity switch and of the user-operable call switch, and a line release transistor connected in series in said common return line and capable of connecting and of disconnecting said common return line from said diode bridge, said microprocessor being connected to control said relay and said release transistor, and being programmed to respond to a user operating said call switch and thereby initially seizing said line by operating said relay to hold the line loop, and to subsequently release the line by turning off said release transistor before releasing said relay, said relay being released after current has ceased to flow in the telephone line, thereby protecting the relay's line holding contacts from being damaged by current surges in the line during release thereof.

2. A telephone set according to claim 1, wherein said relay comprises a bistable relay, thereby enabling the microprocessor to be controlled by computing equipment located outside the telephone to seize the line by turning on the release transistor.

3. A telephone set according to claim 2, wherein said bistable relay is controlled by the microprocessor via a capacitor connected in series with the control winding of the relay and with the emitters of a complementary pair of transistors, said tansistors having their bases connected together and under the control of the microprocessor to control charging and discharging of the capacitor through the relay winding.

4. A telephone set according to claim 2, wherein said telephone set includes an additional power supply circuit for supplying power from a source other than the telephone line, and a circuit for monitoring current flowing in the telephone line via the diode bridge, said monitoring circuit having an output connected to an interrupt input to the microprocessor, and the microprocessor further having switch state sensing inputs connected to contacts of the gravity switch and of the call switch.

5. A telephone set according to claim 1, including a microprocessor starting circuit connected to supply a reset signal to the microprocessor after line seizure once the power supply voltage supplied to the microprocessor has reached an acceptable threshold value.

6. A telephone set according to claim 1, including at least one capacitor connected across the power supply terminals of the microprocessor in order to maintain an adequate power supply thereto during short loop disconnections.

* * * * *